(12) United States Patent
Lane et al.

(10) Patent No.: US 9,020,871 B2
(45) Date of Patent: Apr. 28, 2015

(54) AUTOMATED CLASSIFICATION PIPELINE TUNING UNDER MOBILE DEVICE RESOURCE CONSTRAINTS

(75) Inventors: Nicholas D. Lane, Hanover, NH (US); David Chiyuan Chu, Beijing (CN); Jing Zhao, Beijing (CN); Feng Zhao, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 842 days.

(21) Appl. No.: 12/818,877

(22) Filed: Jun. 18, 2010

(65) Prior Publication Data

US 2011/0313953 A1 Dec. 22, 2011

(51) Int. Cl.
*G06N 99/00* (2010.01)
*G06K 9/00* (2006.01)

(52) U.S. Cl.
CPC .......... *G06N 99/005* (2013.01); *G06K 9/00973* (2013.01)

(58) Field of Classification Search
CPC .......................... G06N 99/005; G06K 9/00973
USPC ............................................................ 706/45
See application file for complete search history.

(56) References Cited

U.S. PATENT DOCUMENTS

| | | | |
|---|---|---|---|
| 6,513,025 | B1 | 1/2003 | Rosen |
| 7,603,348 | B2 | 10/2009 | He et al. |
| 7,669,177 | B2 | 2/2010 | Gerber et al. |
| 2003/0033263 | A1 | 2/2003 | Cleary |
| 2007/0067156 | A1 | 3/2007 | Park |
| 2007/0183655 | A1 | 8/2007 | Konig et al. |
| 2009/0319456 | A1 | 12/2009 | Consul et al. |

OTHER PUBLICATIONS

Miluzzo et al ("Sensing Meets Mobile Social Networks: The Design, Implementation and Evaluation of the CenceMe Application" Nov. 2008).*
Blom et al ("Write Once, Run Anywhere—A Survey of Mobile Runtime Environments" 2008).*
The authoritative dictionary of IEEE standards terms, seventh edition, cover and p. 297 only.*
Benbasat et al., "A Framework for the Automated Generation of Power-efficient Classifiers for Embedded Sensor Nodes", The Media Loboratory, MIT, SenSys 2007, Nov. 6-9, 2007, Sydeny, Australia, pp. 219-pp. 232.
Bharatula et al., "Empirical Study of Design Choices in Multi-sensor Context Recognition Systems", IFAWC: 2nd International Forum on Applied Wearbale Computing, Zurich, Switzerland, Mar. 17-18, 2005, pp. 1-pp. 15.
Junker et al., "Sampling Frequency, Signal Resolution and the Accuracy of Wearable Context Recognition Systems", Proceedings of the Eight International Symposium on Wearable Computers (ISWC'04), 2004, pp. 1-pp. 2.

(Continued)

*Primary Examiner* — Lut Wong
(74) *Attorney, Agent, or Firm* — Dan Choi; Judy Yee; Micky Minhas

(57) ABSTRACT

An architecture and techniques to enable a mobile device to efficiently classify raw sensor data into useful high level inferred data is discussed. Classification efficiency is achieved by tuning the mobile device's raw sensor data classification pipeline to attain a balance of accuracy, latency and energy suitable for mobile devices. The tuning of the classification pipeline is accomplished via a multi-pipeline tuning approach that uses Statistical Machine Learning Tools (SMLTs) and a classification cost modeler.

20 Claims, 4 Drawing Sheets

(56) References Cited

OTHER PUBLICATIONS

Kapoor et al., Learning and Classifying Under Hard Budgets, Department of Computing Science, University of Alberta, pp. 1-pp. 15.
Krause et al., "Trading off Prediction Accuracy and Power Consumption for Context-aware " Proceedings of the 2005 Ninth IEEE Internation Symposium on Wearable Computers (ISWC'05) 2005, pp. 1-pp. 7.
Layar, retrived at www.Layar.com>> on Apr. 16, 2010, pp. 1-pp. 2.
Madani et al., "Active Model Selection", retrived at <<http://www.omadani.net/pubs/2004/active_model_selection_uai04.pdf.. on Apr. 16, 2010, pp. 1-pp. 9.
Miluzzo et al., "Sensing Meets Mobile Social Networks: The Design, Implementation and Evaluation of the Cenceme Application", SenSys '08, Nov. 5-7, 2008, Ralegih North Carolina, pp. 337-pp. 350.
Mun et al, "Peir, the personal environmental impact report, as a platform for participatory sensing systems research", MobiSys 2009, Jun. 22-25, 2009, Krakow, Poland, pp. 55-pp. 68.
Stager,"Low-power Sound-based User Activity Recognition", Disseration submitted to Eth Zurith for the degree of Doctor of Sciences 2006, Swiss Federal Institute of Technology Zurich, pp. 1-pp. 153.
SUn et al., "Robust Mobile Geo-Location Algorithm", IEEE Transation on Vehicular Technology, vol. 54, No. 3, May 3, 2005, pp. 1037-pp. 1041.
Wang et al, "A Framework of Energy Efficient Mobile Sensing for Automatic user State Recognition", MobiSys '09, Jun. 22-25, 2009, Krakow, Poland, 2009, ACM, pp. 1-pp. 14.
Wang et al., "The Tradeoff between Energy Efficiency and user State Estimation Accuracy in Mobile Sensing", retrived at <<http://www-scf.usc.edu/~wangyi/publications/mobicase09.pdf >> on Apr. 16, 2010, pp. 1-pp. 17.
Weiss et al., "Maximizing Classifier Utility When Training Data is Costly", SIGKDD Expolorations, vol. 8, Issue 2, pp. 31-pp. 38.
Yang et al., "Classifying Under Computational Resource Constraints: Anytime Classification Using Probabilistic Estimators", 2007, Machine Learning, Springer 1, pp. 1-pp. 21.

* cited by examiner

AUTOMATED CLASSIFICATION PIPELINE TUNING UNDER MOBILE DEVICE RESOURCE CONSTRAINTS

BACKGROUND

Mobile devices are playing an expanded role in everyday life. This is demonstrated by a constant production of mobile applications that take advantage of the rich multi-modal sensing hardware available on today's mobile devices. For instance, today a wealth of sensors including camera, microphone, GPS, accelerometers, proximity sensors, ambient light sensors, and multi-touch panels are already standard on high and mid-tier mobile devices.

However providing a user with raw sensor readings alone are typically meaningless. Specifically, mobile applications rarely provide a user with raw sensor readings alone since such readings do not easily map to meaningful application level actions that make inferences about the surrounding environment. Rather, mobile applications often employ a sensor data post-processing phase to extract and classify useful high level inferred data, or Application Data Units (ADUs).

For example, a mobile device may execute a human activity inference application which sifts through microphone and accelerometer data to understand when an individual is in a meeting, working alone, or exercising; a transportation inference application might look at patterns in GPS and Wi-Fi signals to determine when an individual takes a car, bike or subway; an augmented reality application might process the camera feed to tag objects that the individual is viewing through the camera lens. These examples span the gamut from rich multi-sensor capture to simple sensor streams. Yet, each application involves non-trivial classification of raw sensor data into ADUs in order to make an inference about the environment.

The concept of mapping raw sensor data readings to high-level ADUs has a long history outside the mobile device space. In this space, Statistical Machine Learning has been identified as offering strong discriminative power to classify raw sensor data. Statistical Machine Learning is used to aide in assigning correct class tags to raw sensor readings via a classification pipeline. For example, activity recognition and image recognition are two applications which frequently employ machine learning.

Thus, machine learning potentially offers a solution for mobile device sensing application development. However, current machine learning techniques are not tuned to operate on the limited battery power available on mobile devices. Specifically, while existing machine learning classification algorithms directly address the problem of ADU construction from base sensor readings, their design is orientated solely towards accuracy. Unfortunately, these machine learning classification algorithms are not purpose-built for mobile settings in which cost (e.g., latency and energy) is of equal importance. Thus, existing algorithms often make resource demands that are unrealistic for mobile devices. Specifically, these algorithm implementations have led to energy expenditures and performance latencies beyond the tolerance of mobile users. The current trend of mobile devices using continuous sensing and classification will only exacerbate these issues.

One proposed solution has been to focus only on tuning a single classification pipeline parameter such as the sampling rate. While tuning this single parameter is relatively convenient and may potentially reduce cost, this single parameter is one of many that affect the classification results. Thus simply tuning a single classification parameter does not necessarily achieve the optimal accuracy/cost benefit.

As discussed above, another proposed solution of porting traditional machine learning techniques to mobile devices have required labor intensive hand-tuning by a developer of a plurality of classification pipeline parameters. This is a very labor intensive process which requires a developer with significant skill. In addition, this hand-tuning does not scale well as system constraints vary e.g., variations in bandwidth, etc.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure describes an architecture and techniques to enable a mobile device to efficiently classify raw sensor data into useful high level inferred data. Classification efficiency is achieved by tuning the mobile device's raw sensor data classification pipeline to attain a balance of accuracy, latency and energy suitable for mobile devices. The tuning of the classification pipeline is accomplished via a multi-pipeline tuning approach that uses Statistical Machine Learning Tools (SMLTs) and a classification cost modeler.

It has previously been difficult for mobile device applications to make inferences via classifying raw sensor data (e.g., GPS data) into ADUs. This is because of the inherent energy limitations of mobile devices. However, the examples below will illustrate an efficient and automatic classification of raw sensor data via a multi-pipeline tuning approach. The use of the multi-pipeline tuning approach also provides a developer with an automated option of tuning the classification pipeline. More specifically, the pipelines automatically cross-tune each other until a desired accuracy and cost result is achieved. In other words, the cross-tuning is a result of the pipelines jointly tuning/optimizing each other. For example, during cross-tuning, the SMLTs adjust pipeline parameters based on the accuracy of the results and the cost constraints provided by the cost modeler. Each adjustment to a particular pipeline is based on the accuracy and cost resulting from another pipeline which eliminates excessive developer hand-tuning. As a result, both pipelines will be configured with the desired accuracy cost result without time intensive developer oversight.

The techniques and systems described herein may be implemented in a number of ways. Example implementations are provided below with reference to the figures.

Illustrative Architectural Environment

Figure 1:
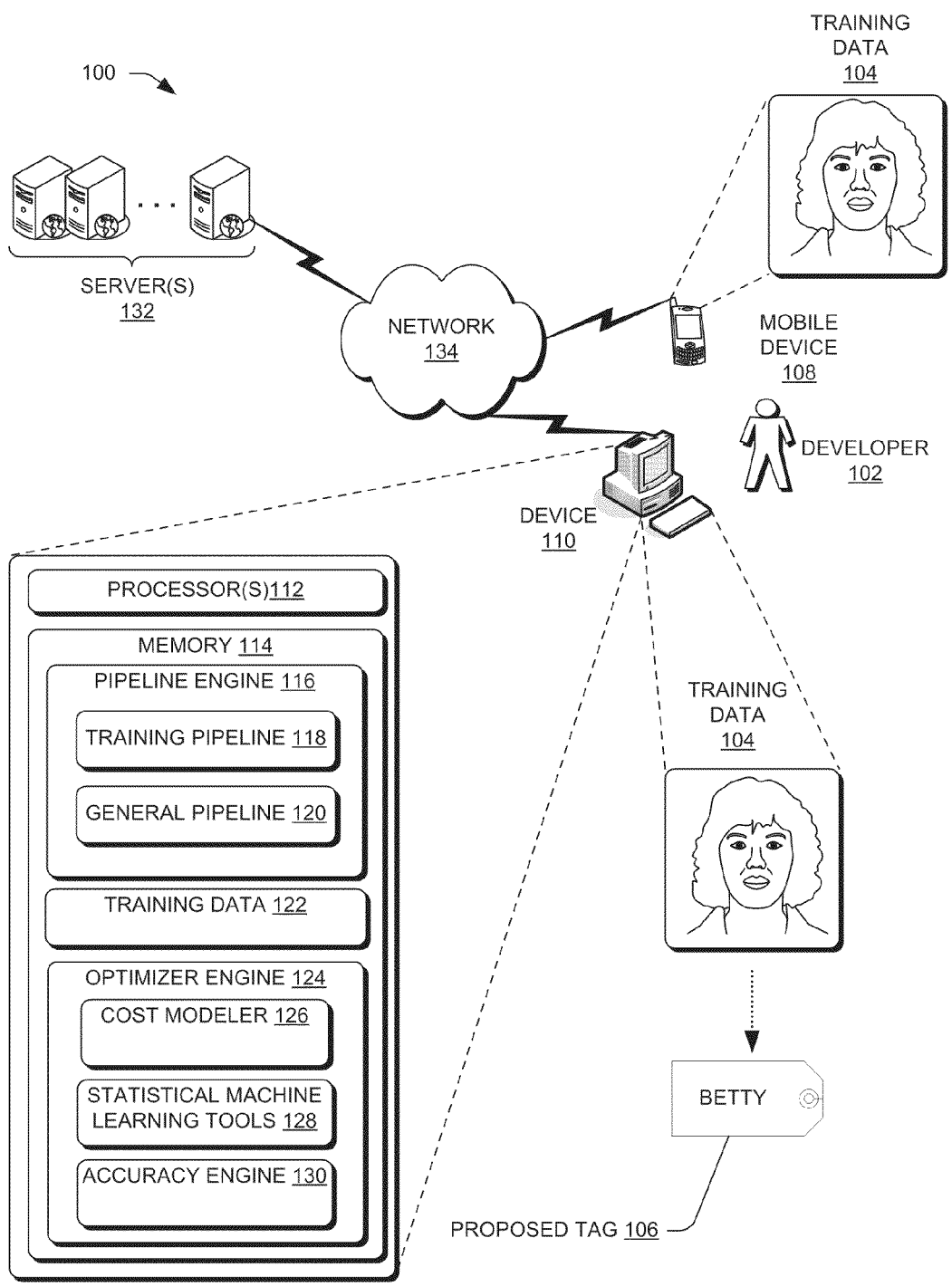
FIG. 1 is a schematic diagram of an illustrative architectural environment that includes various computing devices for auto tuning a general classification pipeline on a mobile device.

FIG. 1 is a schematic diagram of an illustrative architectural environment 100 that includes various computing devices for tuning a general classification pipeline on a mobile device. In particular, FIG. 1 illustrates an environment including a developer 102, training data 104, a proposed tag 106, mobile device 108, device 110 and server(s) 132. In this illustration, developer 102 is training a general classification pipeline on mobile phone 108 to classify and then accurately tag (e.g., the picture of the person in training data picture 104). Specifically, the goal of the developer 102 is to train the general pipeline to accurately recognize that the person pictured in training data 104 is actually Betty and assign a correct name tag to the picture with a minimum of latency and energy cost.

This training is achieved via cross-tuning the classification pipeline parameters. Specifically, the cross-tuning focuses on automatically and iteratively tuning a general classification pipeline with the aid of a training classification pipeline. This cross-tuning of pipelines iteratively uses the feedback of one pipeline to help tune the parameters of the other pipeline and vice versa. For example, for each pipeline results (e.g., a proposed tag and associated cost), the accuracy of the results are analyzed as well the associated cost. If the accuracy or cost is unsatisfactory, then pipeline parameters are adjusted and the adjusted parameters are used to improve the result of the next pipeline.

As illustrated, this training may start with a developer taking a picture of Betty and designating the picture as training data 104. The developer may also associate the known correct tag Betty to the picture. This may be done by mobile device 108, device 110 or another other number or combination of computing devices via network 134. The training data 104 and the known correct name tag of the correct name are then sent to device 110.

In some embodiments, server(s) 132, mobile device 110 and mobile device 108 may communicate via one or more network(s) 134 to facilitate transfer/processing of electronic data. Examples of such networks include both wired based networks (e.g., cable), as well as wireless networks (e.g., cellular, Wi-Fi, satellite, etc.). In addition or as an alternative, the data may be transferred between the devices above via a removable computer readable storage medium such as secure digital (SD) memory cards, portable hard disks, and other portable storage media and/or devices. As yet another alternative, mobile device 108 may be connected to another device that facilitates communication with server(s) 134 and/or device 110. For example, a personal computer might communicate over a network with server(s) 134, and relay desired information to and from mobile device 108 via a communication medium such as USB or Bluetooth. In another embodiment, the data transfer/training process may be done by a combination of computing devices above.

Also as illustrated, computing device 110 includes one or more processors 112 as well as memory 114, upon which a pipeline engine 116, a training data storage 122 and an optimizer engine 124 may be stored. Computing device 110 may comprise of any sort of device capable of executing computer-executable instructions on a processor. For instance, the device 110 may comprise a personal computer, a laptop computer, a mobile phone, a set-top box, a game console, a personal digital assistant (PDA), a portable media player (PMP) (e.g., a portable video player (PVP) or a digital audio player (DAP)), and the like. Mobile device 108 may be any sort of mobile device such as a mobile phone, personal digital assistant (PDA), a portable media player (PMP) (e.g., a portable video player (PVP) or a digital audio player (DAP)), and the like.

As illustrated in FIG. 1, pipeline engine 116 on device 110 provides a general pipeline and a training pipeline. As discussed above, these pipelines serve to process training data while under the direction of certain pipeline parameters. Pipelines that are frequently deployed on mobile devices are general pipelines. In most cases, a developer does not specifically choose which pipeline modules to include in a general pipeline. Choosing modules is unnecessary because the general pipeline is constructed in such a generic way as to be compatible with many different hardware platforms. Thus the generic construction of the general pipeline makes general pipelines relatively easy to port to different hardware platforms. However, this generic construction makes general pipelines relatively inefficient. Therefore, in order to optimize classification accuracy and cost on a mobile device, the general pipeline may be efficiently tuned in regards to cost and accuracy.

On the other hand, training pipelines aid in providing variation of accuracy and cost for different classifications. This is because the training pipeline is constructed from modules that are specifically configured to train the general pipeline for accuracy and cost variation. However, the nature of this pipeline construction makes easily deploying training pipelines to different hardware platforms and adapting the training pipeline to different environmental variations impractical.

Also in FIG. 1, optimizer engine 124 provides a cost modeler 126, statistical machine learning tools 128 and an accuracy engine 130. These tools are used during the cross-tuning process between the pipelines. Specifically, as training data exits a given pipeline with certain parameter settings, the proposed tag is evaluated with the known correct tag. This may be done by accuracy engine 130. For instance, if the given pipeline identifies the training data picture as "Dorothy" instead of Betty, accuracy engine 130 will indicate that at least the parameters affecting accuracy need adjustment. In addition, the cost in terms of latency and energy associated to the result is evaluated by cost modeler 126. The accuracy and cost of a result are then used by statistical machine learning tools to adjust the parameter settings accordingly. In this case, the parameter settings would be adjusted by SMLTs 128 to achieve the desired accuracy within cost constraints. Then, the adjusted parameter settings would be used to determine the results of the next pipeline. This process serves to jointly optimize both pipelines. Thus, cross-pipeline tuning may provide optimum general pipeline parameter settings to efficiently and accurately convert raw data into ADUs.

Figure 2:
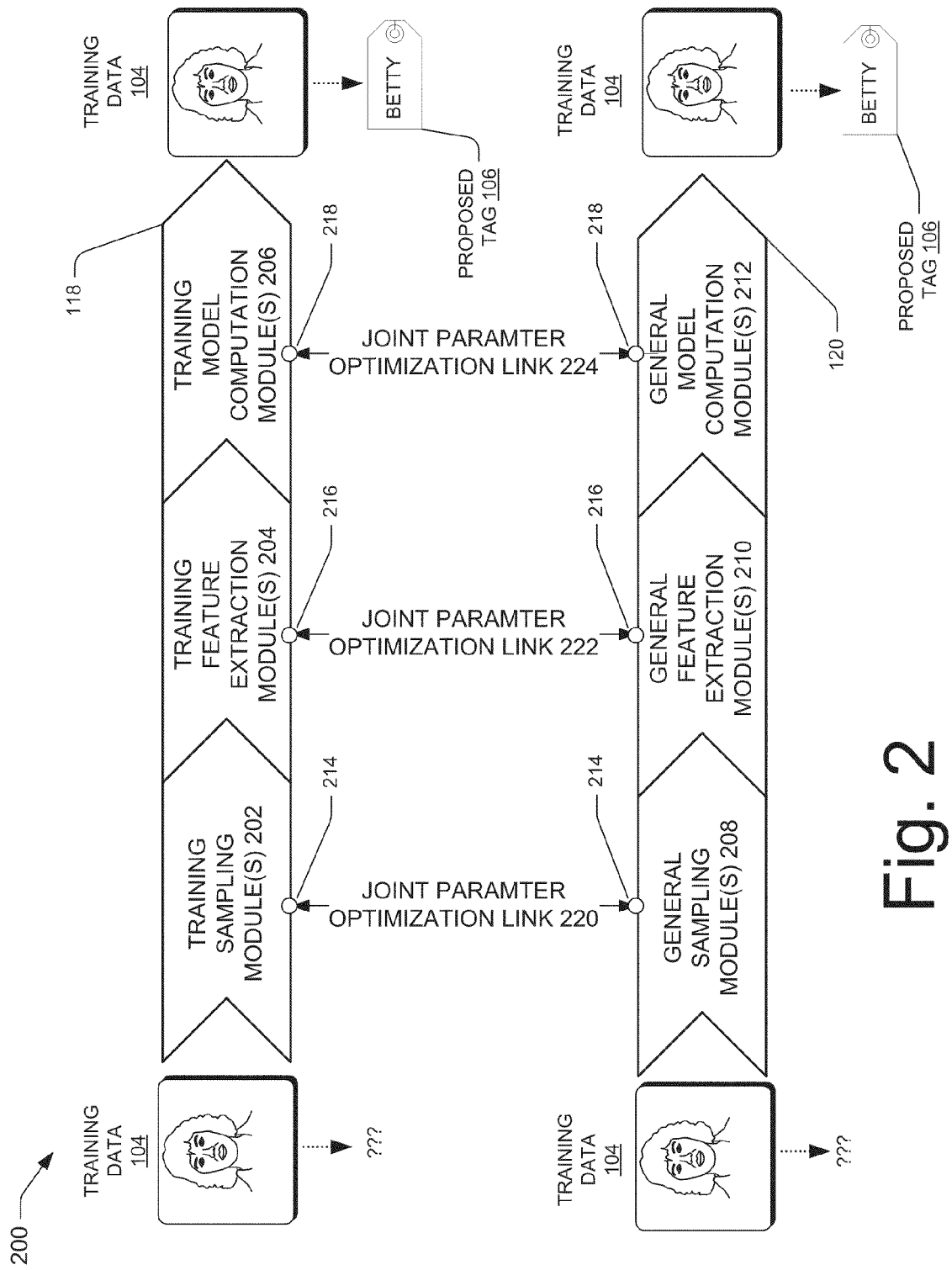
FIG. 2 is a schematic diagram illustrating an exemplary composition of the general pipeline and training pipeline.

FIG. 2 is a schematic diagram 200 illustrating an exemplary composition of the general pipeline 120 and training pipeline 118 as well as their interrelationships. As illustrated, each pipeline is configured to accept training data 104 and output a proposed tag 106.

Several benefits result from cross-tuning different kinds of pipelines (e.g., general and training pipelines). First, cross-tuning enables a general pipeline to receive characteristics (module specific variations on accuracy and cost) of the modules that comprise the training pipeline. These training pipeline characteristics would normally not be available to an untrained general pipeline. As discussed above, the pipelines are both used in an iterative training process the parameters of the general pipeline. More specifically, training data is fed through the training pipeline with an initial set of training parameters. The results are analyzed by accuracy engine 130. If the results are unsatisfactory, the SMLTs 128 and cost modeler 126 adjust the training pipeline parameters. For instance, if the accuracy level of the result was unsatisfactory, the SMLTs 128 may adjust a parameter such as a sampling parameter. In another example, if the accuracy level was acceptable, but the associated cost was unacceptable, the cost modeler 126 may adjust the cost parameters appropriately.

The adjusted parameters are then fed into the general pipeline with training data 104. If the results are unsatisfactory, the components of the optimizer engine 124 adjust the general pipeline parameters and feed them into the training pipeline with training data 104. This cross-training between pipelines iteratively fine-tunes both pipelines until the desired balance of accuracy and cost is achieved (further discussed below in FIG. 3).

As illustrated, each pipeline may be comprised of several general classes of modules, with each class serving a different function. For instance, the general pipeline 118 comprise general sampling modules 202, general feature extraction modules 204 and general model computation modules 206. Training pipeline 120 be similarly comprised of training sampling modules 208, training feature extraction modules 210 and training model computation modules 212.

In one embodiment a developer retrieves a pre-fabricated general pipeline. Typically, the general pipeline is comprised of generalized modules that are pre-configured to run on a plurality of mobile devices. Second, the developer retrieves or creates a training pipeline. If the developer chooses to create the training pipeline, the developer may have an active role in selecting modules for the training pipeline. These modules can be used to introduce desired characteristics into the general pipeline via the cross-tuning. Specifically, characteristics are introduced into the general pipeline when the pipelines exchange parameters.

As discussed above, each pipeline comprises different groups of modules. As illustrated, the sampling modules in each pipeline may serve to query for raw sensor data samples from the training data. The feature extraction modules take the raw sensor data samples and convert the samples into a set of feature vectors. Feature vectors are lossy representations of the raw sensor data samples. In turn, the model computation modules may execute a classification algorithm on each set of feature vectors. This results in an ADU indicating the class (e.g., the proposed name tag "Betty") of the corresponding training data.

As illustrated in FIG. 2, feature extraction modules are provided to extract a variety of different features. These features may in turn offer adjustable parameters which may cross-tune general pipeline 120. For instance, it is often useful to extract temporal/sequential features from raw sensor data. Examples of this kind of data may be GPS traces, audio samples or accelerometer data. Extraction may be aided by the implementation of sliding windows and variable sampling rates. In one embodiment, sliding windows are further parameterized by window size and slide width.

Domain specific features represent another kind of feature that is useful to extract. These features result from certain data types which employ very specific features such as sound, images and video, which use features produced by Speeded Up Robust Features (SURF) and Mel-frequency cepstrum coefficients (MFCCs). These domain specific features may therefore be associated with a specific data types during cross-tuning. For instance, SURF features may be associated with images, and as a result, variations of the default SURF feature are produced. These variations include altering the input image size, color depth, and algorithm-specific parameters such as the number of artifacts permitted. These factors may influence cost as well as accuracy.

Feature size is another feature that may be extracted. Feature size is often a key performance factor for the pipeline modeling stage. There are two ways that feature size may be used to control the size of the feature vector: 1) reducing the feature vector size, and 2) generating only feature vectors of bounded size. In one embodiment, the feature vector size (e.g., dimensionality) is reduced via a Principal Component Analysis (PCA) reduction technique to test the use of small feature vectors. Using PCA (or any one of the many possible dimensionality reduction techniques), feature vectors may be reduced arbitrarily, subject to the desired accuracy and available resource budget. In a second embodiment, feature size may be varied directly by considering possible subsets of feature combinations up to a threshold feature size. To search the subset space efficiently, a feature section heuristic such as an rMBR may also be specified. The rMBR then selects the feature subset that is most discriminative.

Also illustrated in the pipelines are model computation modules. During multi-pipeline tuning, model computation module parameters may also be tuned. In some embodiments, the model computation parameters are specific to a particular classification algorithm a developer selects. There are a multitude of classification algorithms available. In one embodiment, the general pipeline is configured to support four classification algorithms: Support Vector Machine (SVM), Bagged Decision Stumps, Hidden Markov Model (HMM), and k-nearest neighbor (k-NN) classification. In one embodiment, the SVM algorithm implementation uses a publicly-available C# SVM library. In another embodiment, the HMM may be ported from the Matlab HMM Toolbox.

In one embodiment, the HMM embodiment classifier, which is often used in transportation mode inference applications, uses a model complexity that is proportional to the HMM-specific parameter HMM length. (Here, model complexity indicates model computation modules that have a substantial number of parameters in need of cross-tuning.) In this embodiment, the HMM length corresponds to the number of previous sample classifications the model should take into account when computing the class of the current sample.

An embodiment using the k-NN classifier often is used in association with image recognition inference application. In this embodiment, the model complexity is proportional to the size of training data since the k-NN classifier performs a distance-match of the sample to the tagged data.

In the embodiment using the multiclass SVM classifier, the model complexity is proportional to both the size and composition of the training data, as well as the SVM-specific kernel functions (often used for coordinate-space transformation) used by the SVM classifier.

Each pipeline may also feature at least one common interface which is used to exchange parameters between pipelines during cross-tuning. For instance, common sampling interface 214 allows different parameters used in the general sampling module 202 to influence results (e.g., via cross-tuning) produced in training sampling module 208 and vice versa. Common feature extraction interface 216 and common model computation interface 218 provide similar capability for their respective modules in each pipeline. These interfaces are via joint parameter optimization links 220, 222 and 224 respectively.

In one embodiment, these common interfaces are generalizations that are used for iterative multi-pipeline tuning. The generalizations are implemented by a suite of algorithms. These common interfaces provide an interface to communicate parameters from one pipeline to another pipeline during cross-tuning. In other words, during cross-pipeline tuning, the sampling, feature extraction and module computation modules of a first pipeline may produce adjusted parameters that the corresponding modules in a second pipeline may use in producing results. In addition, because of the iterative nature of cross-tuning, the second pipeline's results and adjusted parameters may influence the first pipeline's parameters and results.

Figure 3:
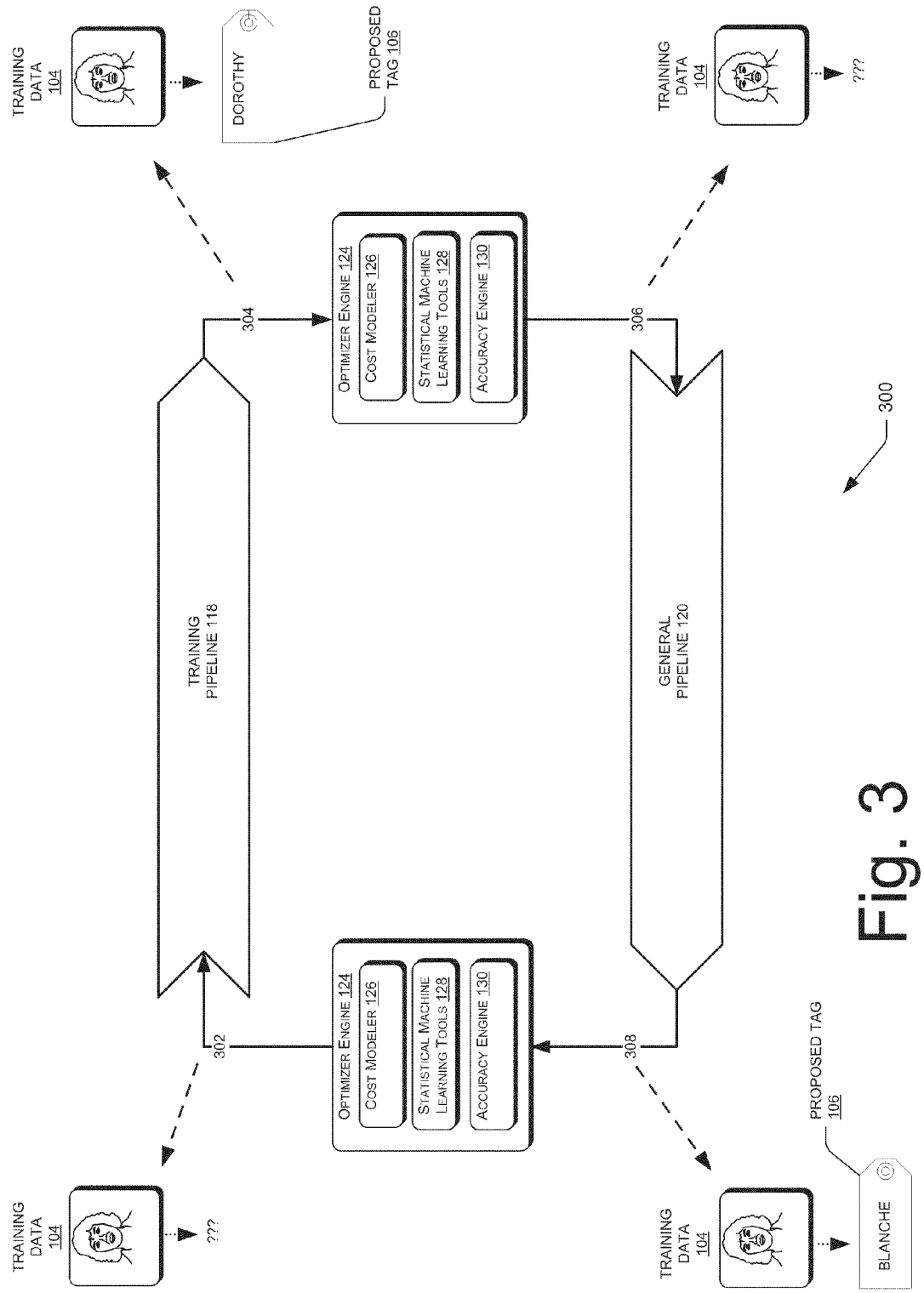
FIG. 3 is a schematic diagram illustrating an exemplary multi-pipeline tuning.

FIG. 3 illustrates an exemplary multi-pipeline tuning 300. During multi-pipeline tuning, the cross-tuning interaction between the training pipeline and general pipeline automatically tunes the general pipeline to a desired balance of accuracy and cost. This is achieved by a joint and iterative optimization of the two pipelines.

First, at point 302, initial values of training pipeline parameters are entered into the training pipeline along with training data 104. At point 304, the training pipeline produces the results. The results comprise a proposed tag 106. Accuracy engine 130 compares the proposed tag ("Dorothy") to the known correct tag ("Betty") and determines the resulting accuracy. Here, the proposed tag is not equivalent to the known correct tag. Cost modeler 126 also determines the cost associated to the result. If either the accuracy or cost is unsatisfactory, the training parameters are adjusted by SMLTs 128.

At point 306, the adjusted training pipeline parameters, training data and an initial set of general pipeline parameters are entered into the general pipeline. At point 308, the results are produced by the general pipeline. Here accuracy engine 122 compares the newly proposed tag ("Blanche") to the known correct tag ("Betty"). Cost modeler 126 also calculates the cost associated to the result. If either accuracy or cost is unsatisfactory, then the general pipeline parameters are adjusted by SMLTs 128. Then the newly adjusted general pipeline parameters are then input with training data and the previously adjusted training pipeline parameters into the training pipeline. This classification pipeline cross-tuning occurs iteratively until the desired balance of accuracy and cost is achieved.

As discussed above, the multi-pipeline tuning uses training parameters as input into the general pipeline and vice versa. Typically, the parameters from the general pipeline and the training pipeline are different variables. For instance, examples of training parameters are HMM graphical model edge weights and SVM kernel function coefficients. Examples of general parameters are image size, HMM length and k-NN (k-Nearest Neighbor) algorithm's k-value. In one embodiment, there are 4 types of parameters. Specifically, general pipeline parameters types may be: (1) data set parameters, (2) feature extraction parameters, and (3) model selection parameters. The training pipeline parameters may be model parameters.

The exchange of parameters from one pipeline to another is executed by the previously discussed joint optimization parameter optimization points in FIG. 2. Specifically each stage in each pipeline (e.g., sampling stage, feature extraction stage and model computation stage) may exchange parameters with corresponding stage in the other pipeline.

The pipelines in turn are configured to accept and process the parameters from the joint parameter optimization points. Specifically, the pipelines are configured to process the parameters from each of the stages together. If each stage was processed in isolation to calculate pipeline parameters, this approach would simply provide a range of different trade-off ratios between mobile system constraints and classification accuracy. However, when these stages are processed together in one pipeline, this processing can account for the interaction between different pipeline stages which allows selection of more efficient operating classification pipeline parameters.

Also illustrated in FIG. 3 is cost modeler 126. Cost modeler 126 maps parameter settings to accuracy gains and resources consumed to find a more efficient pipeline parameter configuration. The possible pipeline configurations during multi-pipeline tuning can be potentially very large. Thus testing each configuration is inefficient. To solve this problem, the cost modeler uses a cost modeling heuristic. Specifically, each stage's (e.g., sampling stage, feature extraction stage and model computation stage) parameters are tested only once while the other stages' parameters are fixed. Thus, initially it is assumed that each stage's contribution to the overall pipeline's profile is independent from the contributions from the other stages. As a result, the primitives that the cost modeler maintains are on a component basis where a component is a fixed parameter setting of a particular stage. For example, a feature extractor stage with feature vector set to 16 bytes is a component, and the cost modeler records how this component configuration influences the classification.

To estimate the accuracy and cost of an entire pipeline, the cost modeler simply provides the summation of each component's contribution to accuracy and cost. Thus, the cost modeler makes the problem of parameter configuration exploration feasible by reducing the parameter configurations explored by a multiplicative factor. Thus, cost modeling is much more practical, since operations are constrained to a classification pipeline consisting of a single dataflow.

In one embodiment it is possible to calculate a pipeline cost for a specific hardware device. For example, if a developer has access to the mobile device hardware before online classifications are needed, it is possible to first enumerate all configuration possibilities ahead of time and model their costs in a pre-processing stage considering the particular hardware device's energy constraints. Then, at run time, the multi-pipeline tuning simply returns the configuration profile with maximum accuracy subject to runtime energy and latency constraints. In one embodiment, a developer only pre-computes configurations for non-multi-programmed settings that do not use cloud resources. In another embodiment, it is possible to perform similar pre-computations for configurations that do use cloud resources by discretizing networking variables such as latency and bandwidth.

Also as illustrated, optimizer engine 124 also provides statistical machine learning tools (SMLT) 128. SMLTs 128 are comprised of tools such as a grid search tool which serve to find a search solution for the optimum parameter settings for the pipelines. Specifically, SMLT 128 serves to find the Pareto frontier of accuracy and costs given of the parameter configurations available. In one embodiment, this process is initiated when resource costs are provided to SMLT 128 grid search by cost modeler 126. In this embodiment, the accuracy estimates are determined by performing five fold cross validation using the training data set using proposed features and prediction models of the pipeline configuration. Cross validation is then used to compare potential alternative pipeline configurations. The range of potential features and model complexity combinations explored will vary based on the classification problem being considered. This will depend on how the classification problem responds to a wide or narrow range of sensor sampling options, feature extraction routines or models.

In some embodiments, the model complexity parameters are data-dependent. For example, the k-NN classifier and multiclass SVM classifier both use data-dependent model complexity parameters. Tuning of these data dependent parameters may occur before construction of the classifier itself. The tuning of these data dependent parameters in their application to model construction resembles active learning methods. This, particular tuning may choose to incorporate additional data in its model while still accounting for both the classification accuracy gains and the external acquisition costs of incorporating new data. This is accomplished by applying active learning methods to focus the data on the training samples that are predicted to provide more discriminative power to model yet simultaneously not raising the cost of classifying future samples significantly. This contrasts with the cost estimation considered in traditional applications of active learning which focus only on the cost to acquire the training sample itself.

General Operation

Figure 4:
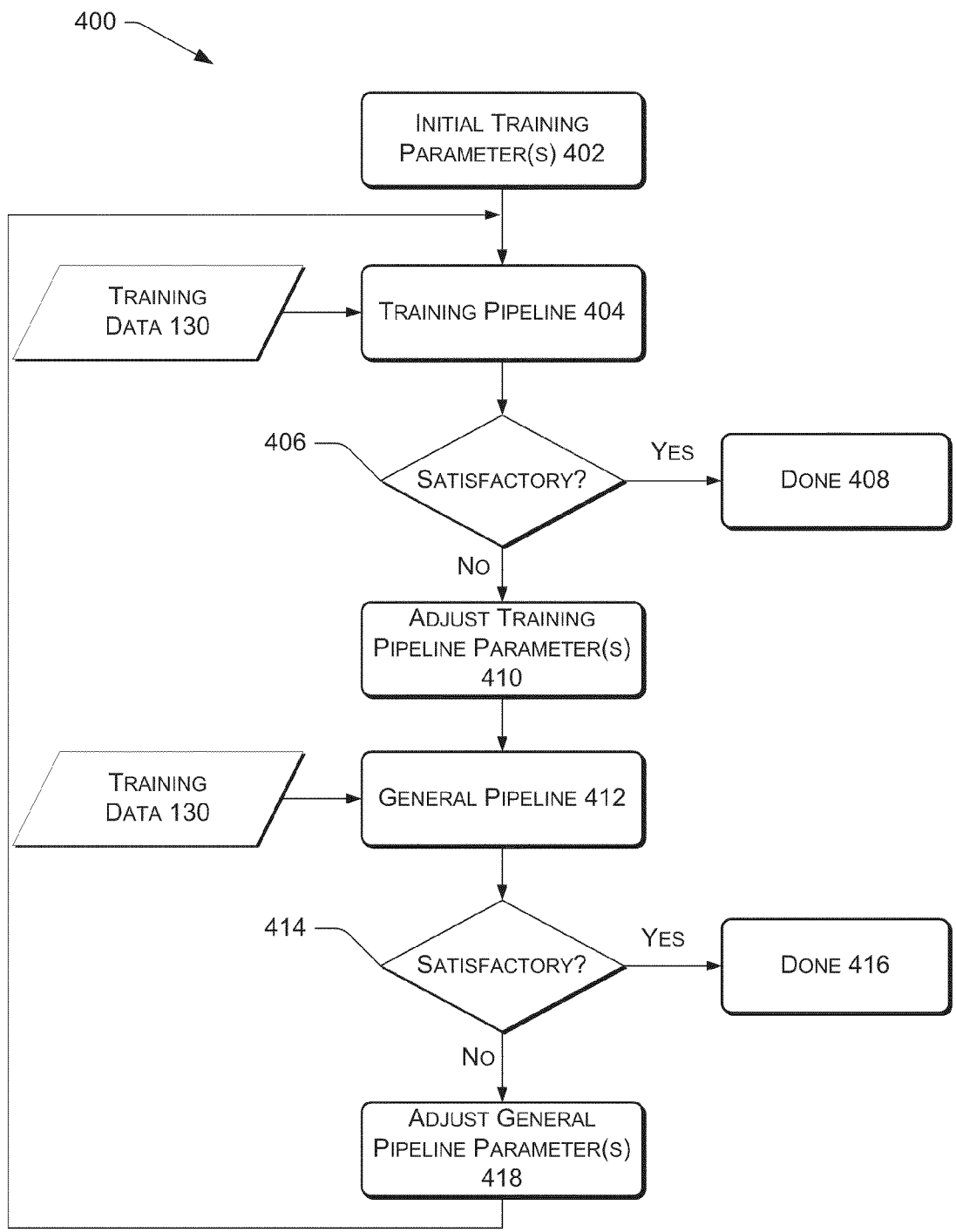
FIG. 4 is a flow diagram illustrating exemplary processes for multi-pipeline tuning.

FIG. 4 illustrates a general process 400 in which the mobile device 104, device 110, server(s) 132 or a combination there of may execute. Specifically, FIG. 4 illustrates an iterative pipeline cross-tuning process to jointly optimize two different pipelines. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 402, an initial set of training parameters are prepared. The initial set of training parameters may be a random set or a set in the range the developer estimates is in the optimum balance of accuracy and cost. At step 404, the initial set of training parameters and training data 130 are fed into the training pipeline. At 406, the results from the initial set of training parameters and training data are examined by accuracy engine 130 and cost modeler 126. If the accuracy of the results and the cost associated to the results are satisfactory (e.g., at 408), then the process stops. However, if the results are unsatisfactory, then the processes continues on to 410. At 410, the training pipeline parameters are adjusted by SMLT 128. SMLT 128 adjusts the parameters based on the accuracy of the results and cost constraints which are supplied by accuracy engine 130 and cost modeler 126. As discussed above, the SMLT 128 adjusts the parameters to achieve results that yield a balance of accuracy and cost.

At 412, the adjusted training parameters, initial general parameters and training data 130 are fed into the general pipeline 412. As discussed above, the parameters from the general and training pipelines are typically different. However, the training parameters of one pipeline stage may influence the corresponding stage of another pipeline as they are fed into the other pipeline via joint parameter optimization links 220, 222 and 224 respectively (see FIG. 2).

The results from the general pipeline are produced at 414 and examined by accuracy engine 130 and cost modeler 126. If the accuracy of the results and the cost associated to the results are satisfactory, then the current general parameters may be deemed as having an appropriate balance of accuracy and cost. Accordingly, the general pipeline parameters will enable a mobile device classification pipeline to efficiently classify raw sensor data.

If the results are unsatisfactory (e.g., at 416), then the general pipeline parameters are adjusted by SMLTs 128 based on the accuracy of the cost constraints. The adjusted general pipeline parameters are then cycled back to 404 and fed into the training pipeline with the training data and the adjusted training parameters. This process of jointly optimizing two different classification pipelines is done iteratively until the desired results and the associated cost are achieved.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer readable storage memory devices including computer instructions executable by a processor of a computing device, the computer instructions being executable for tuning a general classification pipeline by performing operations comprising:
   for individual iterations of a plurality of iterations that alternate between a training classification pipeline and the general classification pipeline, evaluating training data through the training classification pipeline or the general classification pipeline using pipeline parameters, wherein the pipeline parameters include at least one of data set parameters, feature extraction parameters, or model selection parameters; and
   after evaluating the training data for a particular iteration of the plurality of iterations, determining if the training data and the pipeline parameters produce results meeting a criteria, and if the results from the particular iteration do not meet the criteria, then adjusting the pipeline parameters before continuing with a next iteration of the plurality of iterations.

2. The one or more computer readable storage memory devices of claim 1, wherein adjusted parameters from a particular pipeline are used in the next iteration to adjust a next set of parameters for a next pipeline during the next iteration.

3. The one or more computer readable storage memory devices of claim 1, wherein the criteria comprises one or more of a threshold accuracy value, a latency range, or an energy consumption range.

4. The one or more computer readable storage memory devices of claim 1, wherein the general classification pipeline comprises at least a sampling module, a general classification pipeline feature extraction module, or a general classification pipeline model computation module.

5. The one or more computer readable storage memory devices of claim 4, wherein the general classification pipeline feature extraction module and the general classification pipeline model computation module are each configured to exchange parameters with a training classification pipeline feature extraction module, and a training classification pipeline computation module, respectively.

6. The one or more computer readable storage memory devices of claim 1, wherein the adjusting is comprised of determining a Pareto frontier of potential pipeline parameter configurations before continuing with the next iteration.

7. The one or more computer readable storage memory devices of claim 1, wherein the evaluating comprises using a cost model, the cost model configured to calculate a latency cost and an energy cost.

8. The one or more computer readable storage memory devices of claim 7, wherein the calculating of the energy cost comprises calculating the cost with respect to a specific target device hardware energy requirement.

9. The one or more computer readable storage memory devices of claim 1, wherein the general classification pipeline includes a plurality of generalized modules that are pre-configured to execute on a plurality of different mobile devices.

10. A method comprising:
   for individual iterations of a plurality of iterations that alternate between a training classification pipeline and the general classification pipeline, evaluating training data through the training classification pipeline or the general classification pipeline using pipeline parameters, wherein the pipeline parameters include one of data set parameters, feature extraction parameters, or model selection parameters; and after evaluating the training data for a particular iteration of the plurality of iterations, determining if the training data and the pipeline parameters produce results meeting a criteria, and if the results from the particular iteration do not meet the criteria, then adjusting the pipeline parameters before continuing with a next iteration of the plurality of iterations, wherein adjusted parameters from a particular pipeline are used in the next iteration to adjust a next set of parameters for a next pipeline during the next iteration.

11. The method of claim 10, wherein the criteria comprises a threshold accuracy value, a latency range, or an energy consumption range.

12. The method claim 10, wherein the general classification pipeline comprises at least a sampling module, a general classification pipeline feature extraction module, or a general classification pipeline model computation module.

13. The method of claim 12, wherein the general classification pipeline feature extraction module and the general classification pipeline model computation module are each configured to exchange parameters with a training classification pipeline feature extraction module, and a training classification pipeline computation module, respectively.

14. The method claim 10, wherein the adjusting is comprised of determining a Pareto frontier of potential pipeline parameter configurations before continuing with the next iteration.

15. The method of claim 10, wherein the evaluating comprises using a cost model, the cost model configured to calculate a latency cost and an energy cost.

16. A computing device comprising:
a processor; and
a memory coupled to the processor, the memory comprising computer-program instructions executable by the processor for performing acts comprising:
for individual iterations of a plurality of iterations that alternate between a training classification pipeline and the general classification pipeline, evaluating training data through the training classification pipeline or the general classification pipeline using pipeline parameters, wherein the pipeline parameters include one of data set parameters, feature extraction parameters, or model selection parameters; and
after evaluating the training data for a particular iteration of the plurality of iterations, determining if the training data and the pipeline parameters produce results meeting a criteria, and if the results from the particular iteration do not meet the criteria, then adjusting the pipeline parameters before continuing with a next iteration of the plurality of iterations.

17. The computing device of claim 16, wherein adjusted parameters from a particular pipeline are used in the next iteration to adjust a next set of parameters for a next pipeline during the next iteration.

18. The computing device of claim 16, wherein the criteria comprises a threshold accuracy value, a latency range, or an energy consumption range.

19. The computing device of claim 16, wherein the evaluating comprises a cost model, the cost model configured to calculate a latency cost and an energy cost.

20. The computing device of claim 19, wherein the calculating of the energy cost comprises calculating the energy cost with respect to a specific target device hardware energy requirement.

* * * * *